P. CHEEK.
Millstone.
No. 2,222.
Patented Aug. 21, 1841.
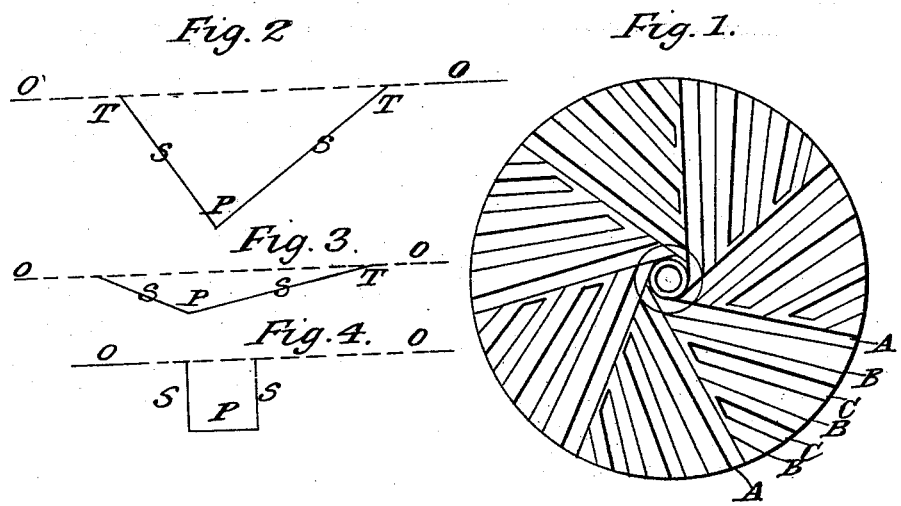

UNITED STATES PATENT OFFICE.

PENDLETON CHEEK, OF HENRY COUNTY, GEORGIA.

MANNER OF DRESSING MILLSTONES WITH VENTILATORS FOR COOLING FLOUR, &c.

Specification of Letters Patent No. 2,222, dated July 26, 1845; Antedated June 5, 1845.

*To all whom it may concern:*

Be it known that I, PENDLETON CHEEK, of the county of Henry and State of Georgia, have invented a new and Improved Mode of Grinding Wheat, Corn, Rye, Oats, &c.; and I do hereby declare that the following is a full and exact description.

The nature of my improvement or invention consists in providing the mill stones with ventiducts or ventilators thereby preventing the flour or meal from being overheated or killed in the process of grinding. These ventilators by keeping up a continual and brisk circulation of fresh air between the two rubbing surfaces of the mill stones keep them cool and free from heat thereby enabling them to grind at least one third more in a given time than they now do in the common way, also saving in a great degree the time labor and machinery required in cooling the flour after it comes from the stones.

To enable others skilled in the art of dressing mill stones, I will proceed to describe their construction and operation. After facing the stones completely true so as to touch everywhere when brought together, then I lay off dress on any of the most approved plans known in the country, but in general the dress referred to in the accompanying drawing I have found to be the best.

Plate 1, Figure 1, represents a three feet stone laid off in seven grand divisions, (but a four foot stone should be laid off in ten). The main leading furrows A, A, are laid under a draft of two inches in a four foot stone. The draft should be three inches. These furrows are cut from the eye to the circumference of the stone about two inches wide, at the eye they should be cut one inch deep and incline to one fourth of an inch deep at the circumference.

The shape of the furrows may vary to suit the fancy of the mill wright but I prefer this (Figs. 2 and 3) represents a furrow cut at right angle. Fig. 2 near the eye and Fig. 3 near the circumference. The dotted line O, O, in both figures, the face of the stone S, S, the sides of the furrow forming an obtuse angle at the bottom P. T, its cutting edge. The intermediate space between the leading furrows may be filled with two, three or four short furrows C, C, (Fig. 1) running nearly parallel with the leading furrows but not into them. These short furrows are not cut so deep as the leading ones. The above dress is for grinding corn meal. For a flour mill the furrows should be half the depth of the above specification and the same in every other respect.

The ventilators B, B, B, (Fig. 1) are laid off, on the center of the lands parallel with the short furrows and runs into the leading furrows. They are cut one half inch deep from the leading furrow to the circumference of the stone and one half inch wide (Fig. 4). O, O, dotted line, the face of the stone; P, the square bottom of the ventiduct; S, S, its perpendicular sides. As the meal will partly fill the ventilators in the bed stone it is not necessary to cut them so deep in it as in the runner.

When the runner is put in motion for grinding the centrifugal force throws off the contiguous atmosphere at a tangent from the circumferenec of the stone, and at a right angle to the center of motion which is in the eye of the mill stone. The effect of this is a continual rush or draft of air through the eye and through the main leading furrows (which is cut deep near the eye for that purpose) thence into the ventilators where it is pressed on to supply the vacuum caused by the throwing off the atmosphere at the circumference of the stone as before stated, thus keeping a continual supply of fresh air between the two rubbing surfaces, and in proportion as the danger of killing or heating the meal or flour (by a high motion of the runner) increases in the same ratio will the supply of fresh air be.

What I claim as my invention and desire to secure by Letters Patent is—

The cutting of ventiducts or ventilators in mill stones which will admit the free circulation of the air between the runner and bed stone thereby keeping them cool and free from heating, burning or killing the meal or flour in the act of grinding, using for that purpose my ventiducts, ventilators or narrow deep furrows as herein stated and which will produce the intended effect.

PENDLETON CHEEK

Witnesses:
H. T. McDANIEL,
PHILIP McDANIEL.